US011809526B2

United States Patent
Xu et al.

(10) Patent No.: US 11,809,526 B2
(45) Date of Patent: Nov. 7, 2023

(54) OBJECT IDENTIFICATION METHOD AND DEVICE AND NON-TRANSITORY COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 364 days.

(21) Appl. No.: 17/163,579

(22) Filed: Feb. 1, 2021

(65) Prior Publication Data
US 2022/0092364 A1 Mar. 24, 2022

(30) Foreign Application Priority Data
Sep. 24, 2020 (CN) .......................... 202011018430.8

(51) Int. Cl.
*G06F 18/24* (2023.01)
*G06N 20/00* (2019.01)
(Continued)

(52) U.S. Cl.
CPC .............. *G06F 18/24* (2023.01); *G06F 18/21* (2023.01); *G06F 18/214* (2023.01);
(Continued)

(58) Field of Classification Search
CPC ........ G06F 18/24; G06F 18/21; G06F 18/214; G06F 18/217; G06F 18/22; G06F 18/285;
(Continued)

(56) References Cited

U.S. PATENT DOCUMENTS

| 8,897,545 B2 * | 11/2014 | Schlosser ................ G06T 7/593 382/154 |
| 10,025,984 B2 * | 7/2018 | Rajkumar .............. G06V 20/10 |
| 2023/0056334 A1 * | 2/2023 | Liu ........................ G06V 10/62 |

FOREIGN PATENT DOCUMENTS

| CN | 110232134 A | * | 9/2019 | ............. G06F 16/51 |
| EP | 2259221 A1 | * | 12/2010 | ........... G06K 9/6255 |

OTHER PUBLICATIONS

"Long Chen et al. Online Multi-Object Tracking With Convolutional Neural Networks, 2017 IEEE International Conference on Image Processing (ICIP), Beijing China" (Year: 2017).*
(Continued)

*Primary Examiner* — Andrae S Allison
*Assistant Examiner* — Phuong Hau Cai
(74) *Attorney, Agent, or Firm* — JCIP GLOBAL INC.

(57) ABSTRACT

The disclosure relates to an object identification method and device as well as a non-transitory computer-readable storage medium. The object identification method includes: acquiring a first object image, and generating a first identification result group according to the first object image, wherein the first identification result group includes one or more first identification results arranged in order of confidence from high to low; acquiring a second object image, and generating a second identification result group based on the second object image, wherein the second identification result group includes one or more second identification results arranged in order of confidence from high to low; and determining whether the first object image and the second object image correspond to the same object to be identified according to the first identification result group and the second identification result group.

18 Claims, 6 Drawing Sheets

(51) Int. Cl.
*G06V 10/75* (2022.01)
*G06V 10/22* (2022.01)
*G06N 5/04* (2023.01)
*G06F 18/21* (2023.01)
*G06F 18/22* (2023.01)
*G06F 18/214* (2023.01)

(52) U.S. Cl.
CPC ............ *G06F 18/217* (2023.01); *G06F 18/22* (2023.01); *G06N 5/04* (2013.01); *G06N 20/00* (2019.01); *G06V 10/22* (2022.01); *G06V 10/751* (2022.01); *G06V 2201/10* (2022.01)

(58) Field of Classification Search
CPC .......... G06N 5/04; G06N 20/00; G06N 3/045; G06V 10/22; G06V 10/751; G06V 2201/10; G06V 10/75; G06V 10/761; G06V 10/764; G06V 10/774; G06V 10/776; G06V 10/82
See application file for complete search history.

(56) References Cited

OTHER PUBLICATIONS

"Joon-Young Kwak et al., Pedestrian Tracking Using Online Boosted Random Ferns Learning in Far-Infrared Imagery for Safe Driving at Night, IEEE Transactions on Intelligent Transportation Systems, vol. 18, No. 1, Jan. 2017" (Year: 2017).*

* cited by examiner

S431 — it is determined whether there is a second identification result, which is the same as the first identification result in the first seventh preset number of first identification results in the first identification result group, existing in the first seventh preset number of second identification results in the second identification result group S432 — when there is a second identification result which is the same as the first identification result in the first seventh preset number of first identification results in the first identification result group, the second identification result is used as the first second identification result in the second identification result group

FIG. 6

S441 — when there are no identical first identification result and the second identification result existing in the first identification result group and the second identification result group, it is determined whether there is a second identification result, which is similar to the first identification result in the first eighth preset number of first identification results in the first identification result group, existing in the first eighth preset number of second identification results in the second identification result group S442 — when there is a second identification result which is similar to the first identification result in the first eighth preset number of first identification results in the first identification result group, the second identification result is used as the first second identification result in the second identification result group

FIG. 7

OBJECT IDENTIFICATION METHOD AND DEVICE AND NON-TRANSITORY COMPUTER-READABLE STORAGE MEDIUM

CROSS-REFERENCE TO RELATED APPLICATION

This application claims the priority benefit of China application serial no. 202011018430.8, filed on Sep. 24, 2020. The entirety of the above-mentioned patent application is hereby incorporated by reference herein and made a part of this specification.

BACKGROUND

Technical Field

The disclosure relates to the technical field of object identification, and in particular, to an object identification method and device and a non-transitory computer-readable storage medium.

Description of Related Art

To identify an object, the user may provide images obtained by photographing the object, and the corresponding object identification program or device will identify these images to obtain information such as the classification of the object. In the identification process, on the one hand, the accuracy rate can hardly reach 100%, on the other hand, there are often differences between different images corresponding to the same object to be identified, such as photographing light, photographing angle and clarity, which might lead to different identification results obtained from several identifications of the same object, and cause confusion to the user and bring a bad user experience.

SUMMARY

Technical Problem

The purpose of the disclosure is to provide an object identification method, an object identification device, and a non-transitory computer-readable storage medium.

According to one aspect of the disclosure, an object identification method is provided, including:

A first object image is obtained, and a first identification result group is generated based on the first object image, the first identification result group includes one or more first identification results which are arranged according to the level of confidence from high to low.

A second object image is obtained, and a second identification result group is generated based on the second object image, the second identification result group includes one or more second identification results which are arranged according to the level of confidence from high to low.

It is determined whether the first object image and the second object image correspond to the same object to be identified according to the first identification result group and the second identification result group.

When the first object image and the second object image correspond to the same object to be identified, the second identification result group is adjusted according to the first identification result group so that the adjusted second identification result group is at least partially consistent with the first identification result group.

In some embodiments, the step of generating a first identification result group according to the first object image includes:

A pre-trained object identification model is utilized to determine the first identification result group based on the first object image; and/or The step of generating the second identification result group according to the second object image includes:

A pre-trained object identification model is utilized to determine the second identification result group based on the second object image.

In some embodiments, the object identification model determines the identification result according to at least one of the photographing location, photographing time, and photographing environment of the object to be identified.

In some embodiments, the object identification model is trained based on a convolutional neural network model or a deep residual network model.

In some embodiments, the step of determining whether the first object image and the second object image correspond to the same object to be identified according to the first identification result group and the second identification result group includes:

The first identification result group is compared with the second identification result group.

In the first first preset number of first identification results in the first identification result group, when at least a second preset number of first identification results are the same as the second preset number of second identification results in the first first preset number of second identification results in the second identification result group, it is determined that the first object image and the second object image correspond to the same object to be identified.

Specifically, the first first preset number is greater than or equal to the second preset number.

In some embodiments, the step of comparing the first identification result group with the second identification result group includes:

The photographing time interval of the first object image and the second object image are determined.

The photographing time interval is compared with the preset time interval.

When the photographing time interval is less than or equal to the preset time interval, the first first preset number of first identification results in the first identification result group is compared with the first first preset number of second identification results in the second identification result group.

In some embodiments, the step of comparing the first identification result group with the second identification result group includes:

The first first preset number of first identification results in the first identification result group and the first first preset number of second identification results in the second identification result group are formed in a set.

The number of elements in the set is determined.

The number of elements is compared with the third preset number.

Specifically, the third preset number is equal to twice the first preset number minus the second preset number.

When the number of elements is less than or equal to the third preset number, it is determined that, in the first first preset number of first identification results in the first identification result group, at least a second preset number of first identification results are the same as the second preset number of second identification results in the first first preset number of second identification results in the second identification result group.

In some embodiments, the step of determining whether the first object image and the second object image correspond to the same object to be identified according to the first identification result group and the second identification result group includes:

The first identification result group is compared with the second identification result group.

When there are no identical first identification result and the second identification result existing in the first identification result group and the second identification result group, the photographing time interval of the first object image and the second object image are determined.

The photographing time interval is compared with the preset time interval.

When the photographing time interval is less than or equal to the preset time interval, it is determined whether there is the first identification result similar to the second identification result in the first identification result group and the second identification result group.

When there is the first identification result similar to the second identification result in the first identification result group and the second identification result group, it is determined that the first object image and the second object image correspond to the same object to be identified.

In some embodiments, the step of determining whether there are similar first identification result and second identification result in the first identification result group and the second identification result group includes:

It is determined whether there are similar first identification result and second identification result in the first identification result group and the second identification result group based on a rule database containing at least a group of similar object types.

In some embodiments, when the first object image and the second object image correspond to the same object to be identified, the step of adjusting the second identification result group according to the first identification result group, so that the adjusted second identification result group is at least partially consistent with the first identification result group includes:

The first first identification result in the first identification result group serves as the first second identification result in the second identification result group.

In some embodiments, when the first object image and the second object image correspond to the same object to be identified, the step of adjusting the second identification result group according to the first identification result group, so that the adjusted second identification result group is at least partially consistent with the first identification result group further includes:

The second first identification result to the fourth preset number of first identification results in the first identification result group, and the first fifth preset number of second identification results in the second identification result group are arranged according to the level of confidence from high to low.

According to the order after arrangement, the first identification results or the second identification results serve as the second to the subsequent second identification results in the second identification result group in sequence.

Specifically, the fourth preset number is less than or equal to the total number of first identification results, and the fifth preset number is less than or equal to the total number of second identification results.

In some embodiments, the fourth preset number is equal to the fifth preset number.

In some embodiments, when the first object image and the second object image correspond to the same object to be identified, the step of adjusting the second identification result group according to the first identification result group, so that the adjusted second identification result group is at least partially consistent with the first identification result group further includes:

When there are no identical first identification result and the second identification result existing in the first identification result group and the second identification result group, it is determined whether there is a second identification result, which is similar to the first identification result in the first sixth preset number of first identification results in the first identification result group, existing in the first sixth preset number of second identification result in the second identification result group.

When there is a second identification result which is similar to the first identification result in the first sixth preset number of first identification results in the first identification result group, the second identification result serves as the second second identification result in the second identification result group.

In some embodiments, when the first object image and the second object image correspond to the same object to be identified, the step of adjusting the second identification result group according to the first identification result group, so that the adjusted second identification result group is at least partially consistent with the first identification result group includes:

It is determined whether there is a second identification result, which is the same as the first identification result in the first seventh preset number of first identification results in the first identification result group, existing in the first seventh preset number of second identification results in the second identification result group.

When there is a second identification result which is the same as the first identification result in the first seventh preset number of first identification results in the first identification result group, the second identification result serves as the first second identification result in the second identification result group.

In some embodiments, when the first object image and the second object image correspond to the same object to be identified, the step of adjusting the second identification result group according to the first identification result group, so that the adjusted second identification result group is at least partially consistent with the first identification result group includes:

When there are no identical first identification result and the second identification result existing in the first identification result group and the second identification result group, it is determined whether there is a second identification result, which is similar to the first identification result in the first eighth preset number of first identification results in the first identification result group, existing in the first eighth preset number of second identification results in the second identification result group.

When there is a second identification result which is similar to the first identification result in the first eighth preset number of first identification results in the first identification result group, the second identification result serves as the first second identification result in the second identification result group.

In some embodiments, the object identification method further includes:

When the first object image and the second object image correspond to the same object to be identified, feature prompt information is output.

Specifically, the feature prompt information indicates a distinguishing feature between at least one of the first identification result and/or the second identification result and an object type similar thereto.

In some embodiments, the feature prompt information includes at least one of text information and picture information.

In some embodiments, the object identification method further includes:

When the first object image and the second object image correspond to the same object to be identified, photographing instruction information is output.

Specifically, the photographing instruction information includes instructions related to acquiring an image of a specific portion of the object to be identified, acquiring an image of at least a portion of the object to be identified at a different angle, or acquiring an image of at least a portion of the object to be identified at a different distance.

According to another aspect of the disclosure, an object identification device is provided, the object identification device includes a processor and a memory, the memory stores instructions, and when the instructions are executed by the processor, the steps of the above object identification method are implemented.

According to another aspect of the disclosure, a non-transitory computer-readable storage medium is provided, which has instructions stored thereon, and when the instructions are executed, the steps of the above object identification method are implemented.

Through the following detailed description of exemplary embodiments of the present disclosure with reference to the accompanying drawings, other features and advantages of the present disclosure will be clearer.

BRIEF DESCRIPTION OF THE DRAWINGS

The drawings constituting a part of the specification describe the embodiments of the disclosure, and together with the specification serve to explain the principle of the disclosure.

With reference to the accompanying drawings, the present disclosure can be understood more clearly based on the following detailed description, in which:

FIG. 6 is a schematic diagram of a part of the process in the object identification method according to the sixth embodiment of the disclosure.

FIG. 7 is a schematic diagram of a part of the process in the object identification method according to the seventh embodiment of the disclosure.

Figure 1:
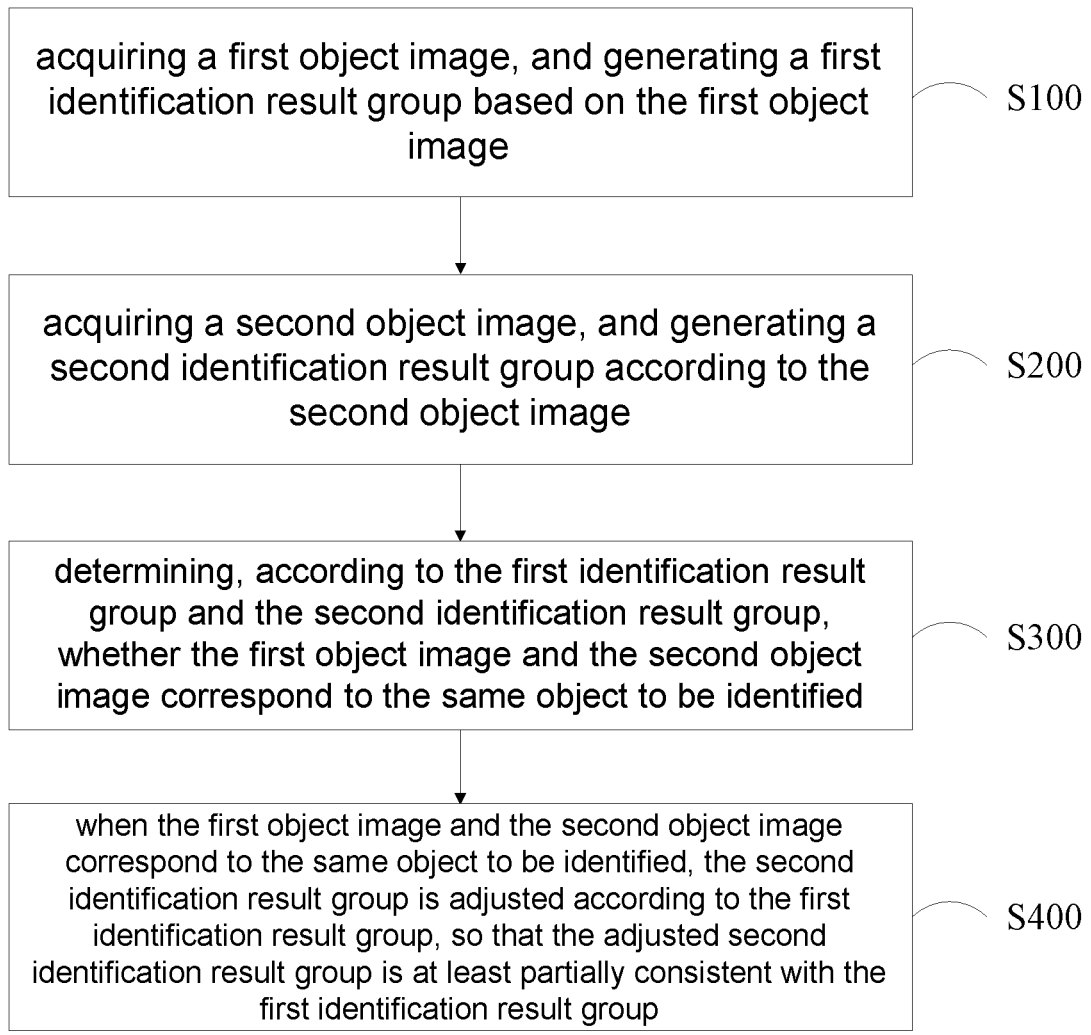
FIG. 1 is a schematic flowchart of an object identification method according to an exemplary embodiment of the disclosure.

Note that in the embodiments described below, the same reference numerals are sometimes used in common between different drawings to denote the same parts or parts with the same functions, and repeated descriptions thereof are omitted. In some cases, similar reference numerals and letters are used to indicate similar items. Therefore, once an item is defined in one figure, it does not need to be further discussed in subsequent figures.

For ease of understanding, the position, size, range, etc. of each structure shown in the drawings etc. sometimes do not indicate the actual position, size, range, etc. Therefore, the disclosure is not limited to the position, size, range, etc. disclosed in the drawings and the like.

DESCRIPTION OF THE EMBODIMENTS

Various exemplary embodiments of the present disclosure will be described in detail below with reference to the accompanying drawings. It should be noted that unless specifically stated otherwise, the relative arrangement of components and steps, digital expressions and numerical values set forth in these embodiments do not limit the scope of the present disclosure.

The following description of at least one exemplary embodiment is merely illustrative in fact, and in no way serves as any limitation to the present disclosure and its application or use. That is to say, the structures and methods in the disclosure are shown in an exemplary manner to illustrate different embodiments of the structures and methods in the present disclosure. However, those skilled in the art will understand that they only illustrate exemplary ways in which the present disclosure can be implemented, rather than exhaustive ways. In addition, the drawings are not necessarily drawn to scale, and some features may be exaggerated to show details of specific components.

The technologies, methods, and devices known to those of ordinary skill in the relevant fields may not be discussed in detail, but where appropriate, the technologies, methods, and devices should be regarded as part of the authorization specification.

In all the examples shown and discussed here, any specific value should be construed as merely exemplary and not as limiting. Therefore, other examples of the exemplary embodiment may have different values.

With the development of image analysis and other technologies, object identification has been used more commonly. In object identification, when the user intends to test the accuracy of identification, the user might perform several identifications on the same object to be identified. Alternatively, when the user has doubts or even disapproval of the previous identification result, the same object to be identified might be photographed again to confirm identification. In actual situations, when the same object to be identified is subjected to multiple times of identification, there might be some differences between the provided object images (for example, the differences are caused by changes in photographing distance, photographing angle, lighting conditions and other parameters). It is necessary to determine the identification performed on the same object to be identified in a timely and accurate manner in order to adjust the generated identification results, thereby reducing user's confusion and improving user experience. In the following description, the technical solution of the disclosure will be described in detail by taking plants as the object to be identified as an example. Those skilled in the art can understand that the object to be identified may also be other types of objects besides plants.

In a specific example, according to the test data, within the first ten minutes when the user uses object identification, the number of identification actions performed on the same object to be identified is likely to be two or more. If this problem is not solved, 15% of users will get different identification results for the same plant, and in the process of multiple identification for the same plant, the consistency rate of identification results is only 80.48%.

In order to solve the above problems, as shown in FIG. 1, in an exemplary embodiment of the disclosure, an object identification method is provided, and the object identification method may include:

Step S100, a first object image is acquired, and a first identification result group is generated according to the first object image.

Step S200: a second object image is acquired, and a second identification result group is generated according to the second object image.

Specifically, the first identification result group includes one or more first identification results arranged according to the level of confidence from high to low, and the second identification result group includes one or more second identification results arranged according to the level of confidence from high to low. Confidence refers to the probability that a certain identification result matches the corresponding object image. In some examples, when the first identification result group or the second identification result group is output, the first identification result or the second identification result with higher confidence may be output first. In other examples, the first identification result and the second identification result of which the confidence is too low (for example, the confidence is less than a preset confidence threshold) may not be output to reduce interference to the user. In still other examples, while outputting the first identification result or the second identification result, the corresponding confidence level may also be output for the user's reference.

A pre-trained object identification model may be utilized to determine the first identification result group based on the first object image, and/or determine the second identification result group based on the second object image. Specifically, the object identification model can be trained based on a neural network model, for example, can be trained based on a convolutional neural network model or a deep residual network model.

The convolutional neural network model is a deep feedforward neural network, which uses a convolution kernel to scan an object image, extracts the features to be identified in the object image, and then identifies the features of the object to be identified. In addition, in the process of identifying the object image, the original object image can be directly input into the convolutional neural network model without preprocessing the object image. Compared with other object identification models, the convolutional neural network model has higher identification accuracy and identification efficiency.

Compared with the convolutional neural network model, the deep residual network model additionally has identity mapping layers, which can avoid the saturation or even decrease of accuracy caused by increase of network depth (the number of stacked layers in the network). The identity mapping function of the identity mapping layer in the deep residual network model needs to satisfy: the sum of the identity mapping function and the input of the deep residual network model is equal to the output of the deep residual network model. After the identity mapping is introduced, the deep residual network model has more obvious changes in the output, so it can greatly improve the accuracy and efficiency of object identification (especially the accuracy and efficiency of plant physiological period identification, thereby improving accuracy and efficiency of plant identification).

In some embodiments, the specific training process of the object identification model may include:

A sample set that includes a certain number of object images marked with identification results is prepared. Specifically, to improve the training effect, a certain number of object images can be prepared for each possible identification result, and the number of object images corresponding to each identification result can be equal or different.

Then, a part of the object images in the sample set are determined as the test set, and the other part of the object images are used as the training set. Specifically, the test set and training set can be determined manually or automatically, and the determining process can be random. In a specific example, the number of samples in the determined test set can be 5% to 20% of the number of samples in the entire sample set. Correspondingly, the number of samples in the training set is 80% to 95% of the number of samples in the entire sample set.

Then, the training set can be used to train the object identification model, and the test set can be used to test the trained object identification model, so as to obtain the accuracy rate of the object identification model. Specifically, the training process specifically includes adjusting each model parameter in the object identification model.

By comparing the accuracy rate of the object identification model with the preset accuracy rate, it can be determined whether training needs to be continued. Specifically, when the accuracy rate of the trained object identification model is greater than or equal to the preset accuracy rate, it can be considered that the accuracy rate of the object identification model meets the requirements, so the training can be ended and the trained object identification model can be used to perform object identification. When the accuracy rate of the trained object identification model is less than the preset accuracy rate, it can be considered that the object identification model needs further optimization. Under the circumstances, the object identification model can be further trained by increasing the number of samples in the training set, specifically by expanding the sample set and/or training set, or increasing the ratio of the number of samples in the training set to the number of samples in the entire sample set. Alternatively, the object identification model itself can be adjusted, and the adjusted object identification model can be trained until an object identification model that meets the requirements is obtained.

In addition, the object identification model may also determine the identification result based on at least one of the photographing location, photographing time, and photographing environment of the object to be identified. Specifically, the photographing location can be a specific location where the plant is located (for example, it can be indicated by latitude and longitude) or a larger area (for example, the Asian region, the American region, etc.); the photographing time can be a specific time of the day, or a certain seasonal period of the year, etc.; the photographing environment may include the temperature and humidity of the surrounding environment of the plant, such as weather and other parameters closely related to growth of the plant.

In the process of training the object identification model, at least one of the photographing location, photographing time, and photographing environment can be simultaneously marked in the corresponding object image. In other words, at least one of the photographing location, photographing time, and photographing environment can be used as a part of the input parameters of the object identification model. When the object is identified, the object image including at least one of the photographing location, photographing time, and photographing environment is input into the object identification model so as to obtain a corresponding identification result.

Alternatively, the photographing location, photographing time, or photographing environment may not be marked in the object image, and the identification recognition model may directly filter the identification results according to at least one of the photographing location, photographing time, and photographing environment. In a specific example, the object identification model may first obtain a candidate identification result library according to at least one of the photographing location, photographing time, and photographing environment, and then obtain one or more identification results from the candidate identification result library according to image identification performed on the input object image. In another specific example, the object identification model may first obtain one or more identification results based on image identification performed on the input object image, and then remove the unmatched identification results from the one or more identification results obtained from the at least one of the photographing location, photographing time, and photographing environment.

Or alternatively, different object identification models can be trained according to different photographing locations, photographing times or photographing environments. During the identification process, corresponding object identification models can be selected for identification according to the photographing location, photographing time or photographing environment. For example, the types of plants that exist in different geographic regions often differ greatly. Therefore, different object identification models can be constructed according to the photographing locations of plants, thereby improving the accuracy rate of identification. Similarly, plants may have different forms in different seasons or even at different times of the day. In the meantime, lighting conditions at different times may also affect the object image, and therefore different object identification models may be constructed according to the photographing time of the object to be identified.

It should be noted that, based on the same object image, the object identification model can generate one or more identification results with corresponding confidence levels, and the identification results generated for the same object image can be classified into the same identification result group for subsequent processing.

In addition, object images taken by users and related information (including photographing location, photographing time, or photographing environment, etc.) can also be collected to enrich the samples in the sample set, so that the object identification model can be further optimized based on these collected samples in the later stage.

Returning to FIG. 1, the object identification method may also include:

Step S300, it is determined whether the first object image and the second object image correspond to the same object to be identified according to the first identification result group and the second identification result group.

Specifically, when the first identification result group and the second identification result group include the same or similar first identification result and the second identification result that satisfy the preset condition, it can be determined that the first object image and the second object image correspond to the same object to be identified. When the first object image and the second object image correspond to the same object to be identified, it can be determined that the user has doubts about the current identification method or the result of the previous identification. In order to reduce the user's doubts and improve the user experience, it is necessary to take some special measures, which will be explained in detail later.

Figure 2:
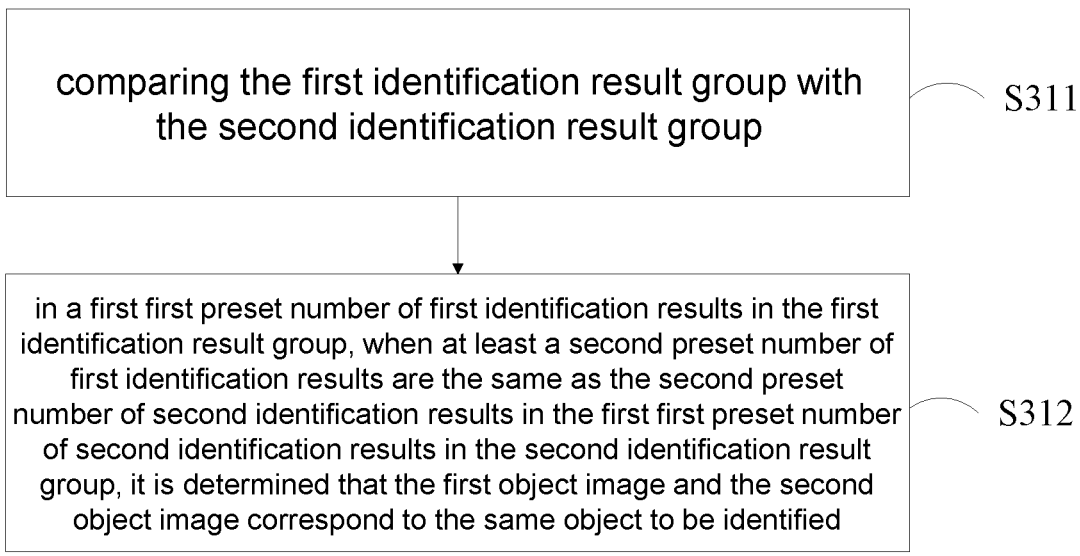
FIG. 2 is a schematic diagram of part of the process in the object identification method according to the first specific embodiment of the disclosure.

In the first specific embodiment, as shown in FIG. 2, the step of determining whether the first object image and the second object image correspond to the same object to be identified according to the first identification result group and the second identification result group may include:

Step S311, the first identification result group is compared with the second identification result group.

Step S312, in a first first preset number of first identification results in the first identification result group, when at least a second preset number of first identification results are the same as a second preset number of second identification results in the first first preset number of second identification results in the second identification result group, it is determined that the first object image and the second object image correspond to the same object to be identified.

Specifically, the first preset number is greater than or equal to the second preset number.

In a specific example, suppose that the first identification result group can be expressed as (R11, R12, R13, . . . , R1m), and the second identification result group can be expressed as (R21, R22, R23, . . . , R2n), wherein, R11, R12, R13, . . . , R1m are m first identification results ranked from high to low level of confidence, R21, R22, R23, . . . , R2n are n second identification results ranked from high to low level confidence. The first preset number can be two, and the second preset number can be one. Then, in the first two first identification results of the first identification result group (that is, the first identification results with the highest level of confidence and the second highest level of confidence), when at least one first identification result is the same as one of the first two second identification results in the second identification result group (that is, the second identification results with the highest level of confidence and the second highest level of confidence), for example, when R11 in R11 and R12 is the same as R22 in R21 and R22, it is determined that the first object image and the second object image correspond to the same object to be identified.

In another specific example, the first preset number may be three, and the second preset number may be two. Then, in the first three first identification results of the first identification result group (that is, the first identification results with the highest level of confidence, the second highest level of confidence, and the third highest level of confidence), at least two of the first identification results are the same as two of the first three second identification results in the second identification result group (that is, the second identification results with the highest level of confidence, the second highest level of confidence, and the third highest level of confidence), for example, when R11 in R11, R12, and R13 is the same as R22 in R21, R22, and R23, and R12 is the same as R23, it is determined that the first object image and the second object image correspond to the same object to be identified. Compared with the previous example where the first preset number is two and the second preset number is one, the probability of misjudging that the first object image and the second object image correspond to the same object to be identified in this example will be decreased, but at the same time, some situations where the first object image and the second object image correspond to the same object to be identified might be left out. According to the test results, the probability of misjudgment in this example compared to the previous example can be reduced from 5% to 0.6%, but the probability of omission will increase from 9% to 11%. It can be understood that in other specific examples, the values of the first preset number and/or the second preset number can also be changed as needed.

In the second specific embodiment, the step of comparing the first identification result group with the second identification result group may include:

The photographing time intervals of the first object image and the second object image are determined.

The photographing time interval is compared with the preset time interval.

When the photographing time interval is less than or equal to the preset time interval, the first first preset number of first identification results in the first identification result group is compared with the first first preset number of second identification results in the second identification result group.

That is to say, when determining whether the first object image and the second object image correspond to the same object to be identified, the photographing time intervals of the first object image and the second object image may also be taken into consideration. Only when the photographing time interval is short, that is, less than or equal to the preset time interval, the first identification result group and the second identification result group are further compared to determine whether the first object image and the second object image correspond to the same object to be identified. In this manner, it is possible to quickly exclude some situations where the first object image and the second object image do not correspond to the same object to be identified, reduce the data rate to be processed, and improve computation efficiency.

Certainly, in other embodiments, according to actual needs, the judgment on the photographing time interval can also be performed after comparing the first identification result group and the second identification result group.

In some embodiments, the step of comparing the first identification result group with the second identification result group may include:

A first first preset number of first identification results in the first identification result group and a first first preset number of second identification results in the second identification result group are formed into a set.

The number of elements in the set is determined.

The number of elements is compared with the third preset number.

Specifically, the third preset number is equal to twice the first preset number minus the second preset number.

When the number of elements is less than or equal to the third preset number, it is determined that, in the first first preset number of first identification results in the first identification result group, at least a second preset number of first identification results are the same as a second preset number of second identification results in the first first preset number of second identification results in the second identification result group.

In a specific example, suppose that the first identification result group can be expressed as (R11, R12, R13, . . . , Rim), and the second identification result group can be expressed as (R21, R22, R23, . . . , R2n); the first preset number is 3, the second preset number is 2, and it can be obtained that the third preset number is 4 according to calculation. Then, the elements in the set may include the first three first identification results R11, R12, R13 in the first identification result group and the first three second identification results R21, R22, and R23 in the second identification result group. It should be noted that the elements in the set are mutually different, so when the same elements are included in R11, R12, R13, R21, R22, and R23, the number of elements in the set will be less than 6. When R11, R12, R13, R21, R22, and R23 include at least two sets of identical first identification result and second identification result, the number of elements will be less than or equal to the third preset number 4.

In another specific example, assuming that the first preset number is 2, the second preset number is 1, and it can be obtained that the third preset number is 3 according to calculation. Then, the elements in the set may include the first two first identification results R11 and R12 in the first identification result group and the first two second identification results R21 and R22 in the second identification result group. When R11, R12, R21, and R22 include at least one set of identical first identification result and second identification result, the number of elements will be less than or equal to the third preset number 3.

Figure 3:
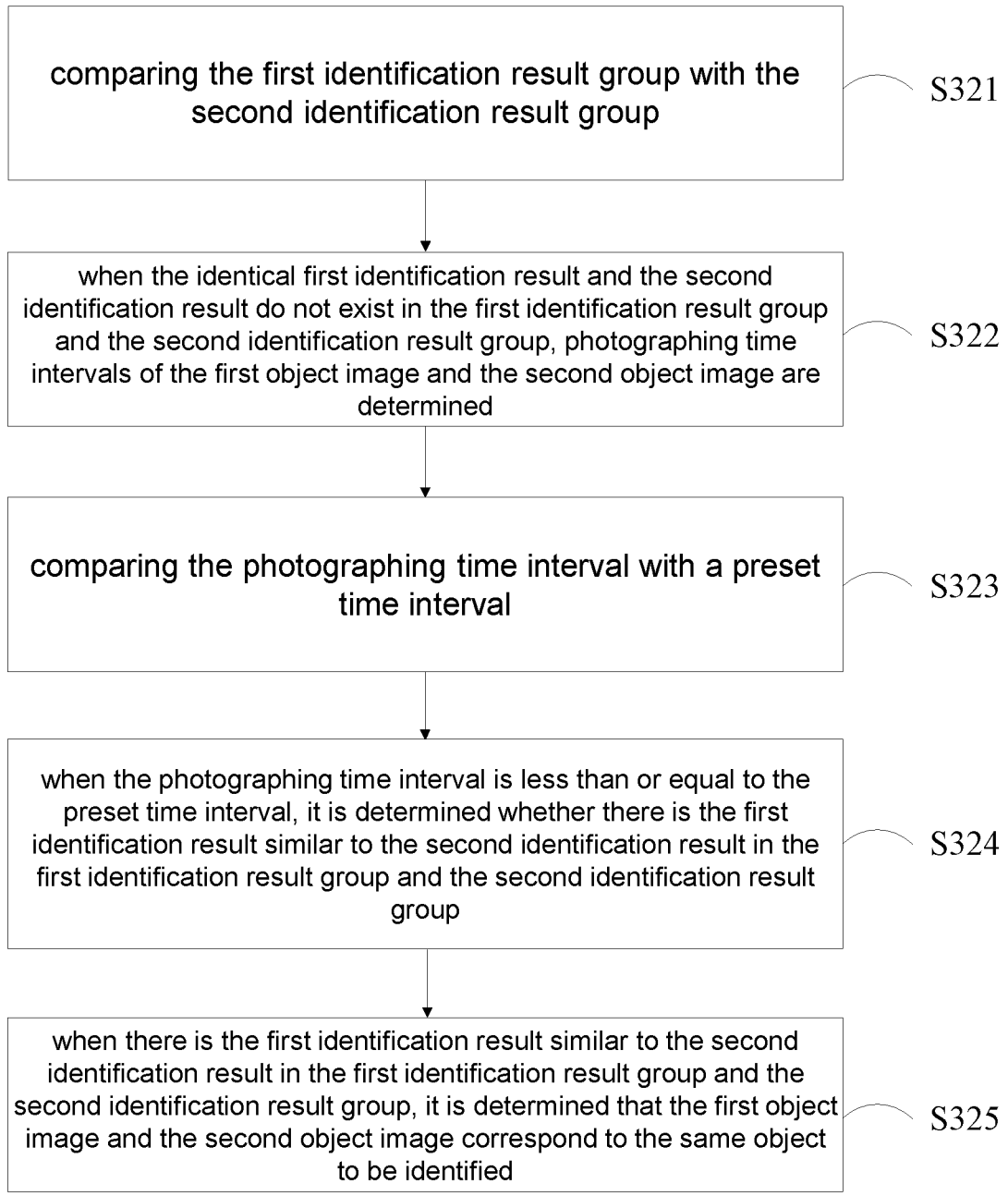
FIG. 3 is a schematic diagram of part of the process in the object identification method according to the third specific embodiment of the disclosure.

In actual situations, considering that the objects may have high similarity and the identification accuracy rate is not 100%, there might not be first identification result and second identification result existing in the first identification result group and the second identification result group generated according to the first object image and the second object image corresponding to the same object to be identified. In order to avoid misjudgment of this situation, in the third specific embodiment of the disclosure, as shown in FIG. 3, the step of determining whether the first object image and the second object image correspond to the same object to be identified according to the first identification result group and the second identification result group may include:

Step S321, the first identification result group is compared with the second identification result group.

Step S322, when there are no identical first identification result and second identification result existing in the first identification result group and the second identification result group, photographing time intervals of the first object image and the second object image are determined.

Step S323, the photographing time interval is compared with the preset time interval.

Step S324, when the photographing time interval is less than or equal to the preset time interval, it is determined whether there is the first identification result similar to the second identification result in the first identification result group and the second identification result group.

Step S325, when there is the first identification result similar to the second identification result in the first identification result group and the second identification result group, it is determined that the first object image and the second object image correspond to the same object to be identified.

In other words, when there are no identical first identification result and second identification result in the first identification result group and the second identification result group, the photographing time interval and similar identification results can be combined to determine whether the first object image and the second object image correspond to the same object to be identified, thereby reducing misjudgment and improving the accuracy of judgment.

Specifically, the step of determining whether there is the first identification result similar to the second identification result in the first identification result group and the second identification result group may include:

It can be determined whether there is the first identification result similar to second identification result in the first identification result group and the second identification result group based on a rule database containing at least one group of similar object types.

Specifically, the rule database can be pre-created, and it can contain multiple groups of confusingly similar object types. In addition, the rule database may also include the distinguishing features of these similar object types, as well as the optimized photographing parameters for these distinguishing features. For each first identification result in the first identification result group, search for objects similar to the first identification result in the database can be conducted, and then return to the second identification result group to search whether there is a second identification result that is the same as the similar object. If so, it can be regarded that the second identification result is similar to the first identification result, and it can be further determined whether the first object image and the second object image correspond to the same object to be identified according to the similar first identification result and the second identification result.

Returning to FIG. 1, in an exemplary embodiment of the disclosure, the object identification method may further include:

Step S400, when the first object image and the second object image correspond to the same object to be identified, the second identification result group is adjusted according to the first identification result group, so that the adjusted second identification result group is at least partially consistent with the first identification result group.

In some embodiments, that the adjusted second identification result group is at least partially consistent with the first identification result group may be that the first second identification result of the adjusted second identification result group is consistent with the first first identification result of the first identification result group. That is, the first identification result and the second identification result generated respectively with the highest level of confidence are consistent. In other embodiments, that the adjusted second identification result group is at least partially consistent with the first identification result group may be that the first several second identification results of the adjusted second identification result group are consistent with the first several first identification results of the first identification result group (specifically, the order of the first identification result in the first identification result group and the order of the second identification result in the second identification result group may be the same or different). It can be understood that other methods can also be used according to actual needs to define that the adjusted second identification result group is at least partially consistent with the first identification result group.

In some embodiments, the second identification result group can be adjusted to ensure that the first second identification result of the adjusted second identification result group is consistent with the first first identification result of the first identification result group. In this way, the two identification results generated respectively with the highest level of confidence will be the same, which can effectively reduce user's confusion and improve user experience. Specifically, when the first object image and the second object image correspond to the same object to be identified, the step of adjusting the second identification result group according to the first identification result group, so that the adjusted second identification result group is at least partially consistent with the first identification result group may include:

Step S411, the first first identification result in the first identification result group is used as the first second identification result in the second identification result group.

Figure 4:
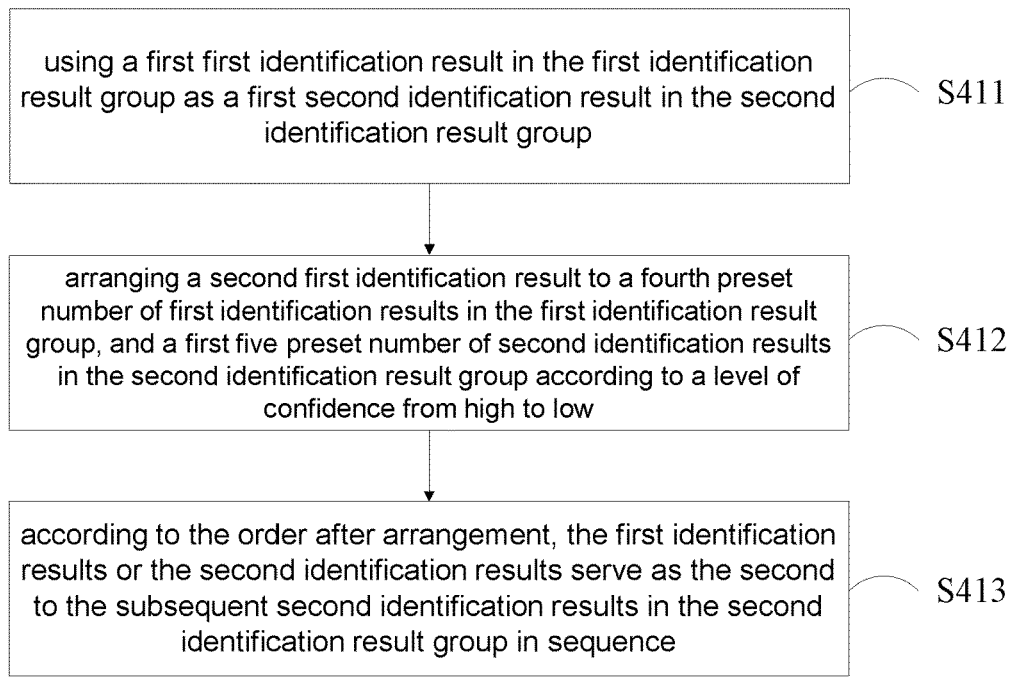
FIG. 4 is a schematic diagram of a part of the process in the object identification method according to the fourth embodiment of the disclosure.

Further, as shown in FIG. 4, in the fourth specific embodiment, for other second identification results in the second identification result group except the first second identification result, adjustments can be made according to the following rules. That is, when the first object image and the second object image correspond to the same object to be identified, the step of adjusting the second identification result group according to the first identification result group, so that the adjusted second identification result group is at least partially consistent with the first identification result group may further include:

Step S412, the second first identification result in the first identification result group to the fourth preset number of first identification results, and the first fifth preset number of second identification results in the second identification result group are arranged in the order of level of confidence from high to low.

Step S413, according to the order after arrangement, the first identification results or the second identification results serve as the second to subsequent second identification results in the second identification result group in sequence.

Specifically, the fourth preset number is less than or equal to the total number of first identification results, and the fifth preset number is less than or equal to the total number of second identification results.

Especially when there are identical first identification result and second identification result existing in the first identification result group and the second identification result group, the steps may be adopted to adjust the second identification result group. In addition, in order to avoid that the adjusted second identification result group contains more first identification results or more second identification results, the fourth preset number may also be equal to the fifth preset number.

In a specific example, suppose that the first identification result group can be represented as (R11, R12, R13), the second identification result group can be represented as (R21, R22, R23), the first preset number is 3, the second preset number is 2, and it can be obtained that the third preset number is 4 according to calculation. Then, the elements in the set may include the first three first identification results R11, R12, and R13 in the first identification result group and the first three second identification results R21, R22, and R23 in the second identification result group. When R11, R12, R13, R21, R22, and R23 include at least two groups of identical first identification result and second identification result, the number of elements will be less than or equal to the third preset number 4.

In addition, the fourth preset number may be equal to the total number 3 of the first identification results, and the fifth preset number may be equal to the total number 3 of the second identification results. Then, R12, R13, R21, R22, and R23 are arranged according to the level of confidence from high to low. Assuming that the identification results with the highest and second highest level of confidence are R21 and R12, respectively, then the adjusted second identification result group may be (R11, R21, R12). Certainly, in other specific examples, the number of second identification results in the adjusted second identification result group may also be different from the number of second identification results in the second identification result group before adjustment, but the order of each of the second identification results is obtained based on the order of R12, R13, R21, R22 and R23 arranged according to the level of confidence from high to low.

According to the test, the consistency rate of the identification results obtained by the above method can rise from 80.48% to 90.14%.

In another specific example, suppose that the first identification result group can be expressed as (R11, R12, R13), the second identification result group can be expressed as (R21, R22, R23), and the first preset number is 2, the second preset number is 1, and it can be obtained that the third preset number is 3 according to calculation. Then, the elements in the set may include the first two first identification results R11 and R12 in the first identification result group as well as the first two second identification results R21 and R22 in the second identification result group. When R11, R12, R21, and R22 include at least one group of identical first identification result and second identification result, the number of elements will be less than or equal to the third preset number 3.

In addition, the fourth preset number may be equal to the total number 3 of the first identification results, and the fifth preset number may be equal to the total number 3 of the second recognition results. Then, R12, R13, R21, R22, and R23 are arranged in the order of confidence level from high to low. Assuming that the identification results with the highest and the second highest confidence level are R21 and R12, then the adjusted second identification result group is (R11, R21, R12).

According to the test, the consistency rate of the identification results can be increased from 80.48% to 91.95%, which is also higher than the consistency rate 90.14% in the previous example.

Certainly, in other embodiments, the fourth preset number may also be less than the total number of the first identification results, and/or the fifth preset number may be less than the total number of the second identification results according to needs.

Figure 5:
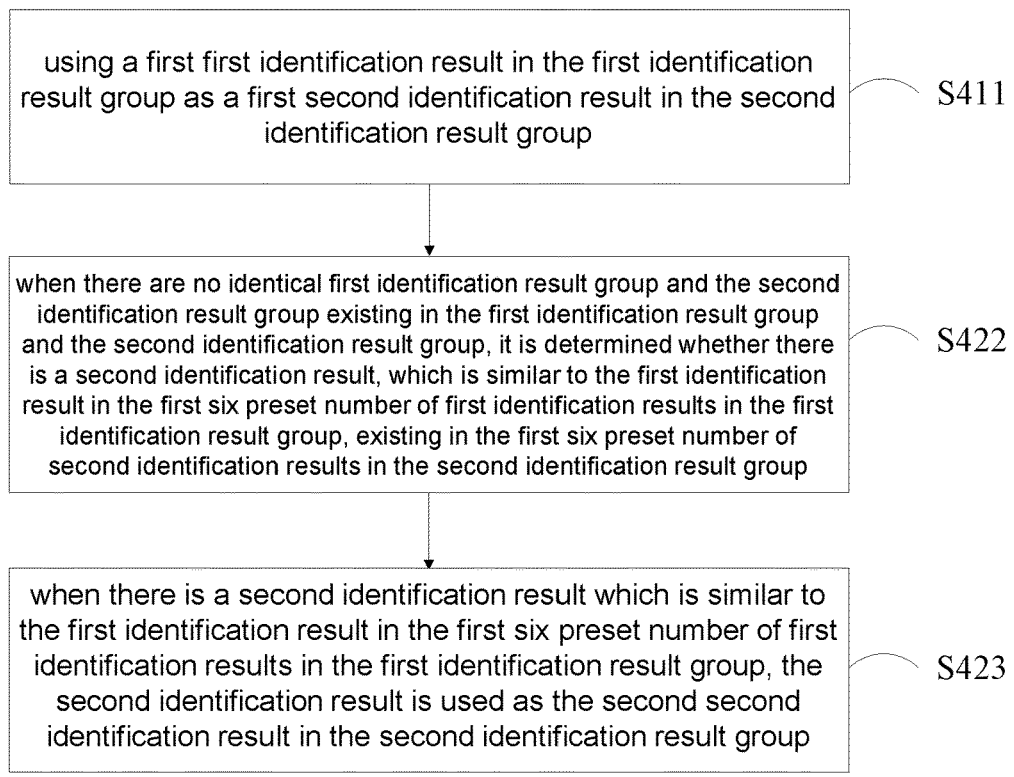
FIG. 5 is a schematic diagram of a part of the process in the object identification method according to the fifth embodiment of the disclosure.

In the case that there are no identical first identification result and the second identification result existing in the first identification result group and the second identification result group, the second identification result that is similar to a certain first identification result can be adjusted to the front position as much as possible. As shown in FIG. 5, in the fifth specific embodiment, when the first object image and the second object image correspond to the same object to be identified, the step of adjusting the second identification result group according to the first identification result group, so that the adjusted second identification result group is at least partially consistent with the first identification result group may further include:

Step S422, when there are no identical first identification result group and the second identification result group existing in the first identification result group and the second identification result group, it is determined whether there is a second identification result, which is similar to the first identification result in the first sixth preset number of first identification results in the first identification result group, existing in the first sixth preset number of second identification results in the second identification result group.

Step S423, when there is a second identification result which is similar to the first identification result in the first sixth preset number of first identification results in the first identification result group, the second identification result is used as the second second identification result in the second identification result group.

In a specific example, it is assumed that the first identification result group can be expressed as (R11, R12, R13), the second identification result group can be expressed as (R21, R22, R23), and the sixth preset number is 2. There are no identical first identification result and second identification result existing in the first identification result group and the second identification result group, and only R12 and R21 are similar. Accordingly, in the adjusted second identification result group, the first second identification result is R11, and the second second identification result is R12 (R21).

In other embodiments, the second identification result group can also be adjusted by combining the two identification results, so that the identification result reflected at the second time is as accurate as possible without being over limited by the first identification. For example, as shown in FIG. 6, in the sixth specific embodiment, when the first object image and the second object image correspond to the same object to be identified, the step of adjusting the second identification result group according to the first identification result group, so that the adjusted second identification result group is at least partially consistent with the first identification result set may include:

Step S431, it is determined whether there is a second identification result, which is the same as the first identification result in the first seventh preset number of first identification results in the first identification result group, existing in the first seventh preset number of second identification results in the second identification result group.

Step S432, when there is a second identification result which is the same as the first identification result in the first seventh preset number of first identification results in the first identification result group, the second identification result is used as the first second identification result in the second identification result group.

In a specific example, it is assumed that the first identification result group can be expressed as (R11, R12, R13), the second identification result group can be expressed as (R21, R22, R23), and the seventh preset number is 2. If R21 in R21 and R22 is the same as R12 in R11 and R12, then R21 (R12) can be used as the first second identification result in the adjusted second identification result group, instead of using R11 as the first second identification result in the adjusted second identification result group. Since R21 (R12) exists in the two times of identifications, it can be considered that the identifications have a higher accuracy rate.

In the case that there are no identical first identification result and the second identification result existing in the first identification result group and the second identification result group, as shown in FIG. 7, in the seventh specific embodiment, when the first object image and the second object image correspond to the same object to be identified, the step of adjusting the second identification result group according to the first identification result group, so that the adjusted second identification result group is at least partially consistent with the first identification result group may include:

Step S441, when there are no identical first identification result and the second identification result existing in the first identification result group and the second identification result group, it is determined whether there is a second identification result, which is similar to the first identification result in the first eighth preset number of first identification results in the first identification result group, existing in the first eighth preset number of second identification results in the second identification result group.

Step S442, when there is a second identification result which is similar to the first identification result in the first eighth preset number of first identification results in the first identification result group, the second identification result is used as the first second identification result in the second identification result group.

In a specific example, it is assumed that the first identification result group can be expressed as (R11, R12, R13), the second identification result group can be expressed as (R21, R22, R23), and the eighth preset number is 2. If there are no identical first identification result and the second identification result existing in the first identification result group and the second identification result group, and R21 in R21 and R22 is similar to R12 in R11 and R12, then R21 can be used as the first second identification result in the adjusted second identification result group. Specifically, the method for determining the similar first identification result and second identification result can be inferred from the method which is based on the rule database as described above.

It can be understood that when the user has captured images three times or more, the user can refer to the above method to determine whether the current photographing and the previous photographing are directed at the same object to be identified, and adjust the currently obtained identification result group according to the previously obtained identification result group.

In some embodiments of the disclosure, the object identification method may further include:

When the first object image and the second object image correspond to the same object to be identified, feature prompt information is output.

Specifically, the feature prompt information may indicate a distinguishing feature between at least one first identification result and/or a second identification result and an object type similar thereto. As mentioned above, the distinguishing features can be included in the rule database to be obtained. The feature prompt information may include at least one of text information and picture information. The user can better identify the object to be identified based on the feature prompt information.

In a specific example, a group of similar objects to be identified may include peach blossoms and cherry blossoms. Their corresponding distinguishing features are: peach blossoms are seed-shaped, with a pointed shape at the outer end of the petals, and a triangular notch is formed at the outer end of the petals of the cherry blossoms. In another specific example, a group of similar objects to be identified can include roses and *Rosa chinensis*, and their corresponding distinguishing features are: the scape of the *Rosa chinensis* is smooth, and the tip of the thorn has a slight curvature; as for the roses, there are more thorns on the scape, and the tip of the thorn is not curved while there are some tiny fluff on the stem. These distinguishing features can be included in the feature prompt information, and displayed to the user in the form of text information or picture information or a combination of the two for the user to tell the difference.

In some embodiments of the disclosure, the object identification method may further include:

When the first object image and the second object image correspond to the same object to be identified, photographing instruction information is output.

Specifically, the photographing instruction information may include instructions related to acquiring an image of a specific portion of the object to be identified, acquiring an image of at least a portion of the object to be identified at a different angle, or acquiring an image of at least a portion of the object to be identified at a different distance.

As mentioned above, photographing parameters optimized for distinguishing features can be included in the rule database to be obtained, and these photographing parameters can be included in the photographing instruction information and output. In a specific example, corresponding to a group of similar objects to be identified including peach blossoms and cherry blossoms, the photographing parameters may include: photographing details of petal. In another specific example, corresponding to a group of similar objects to be identified including roses and *Rosa chinensis*, the photographing parameters may include: photographing a flower stem and keeping a distance from the flower stem so that a plurality of flower thorns are shown in the mage. By outputting photographing prompt information including photographing parameters, it shows that the user can better provide object images that help improve the identification accuracy rate, thereby improving the identification effect.

Figure 8:
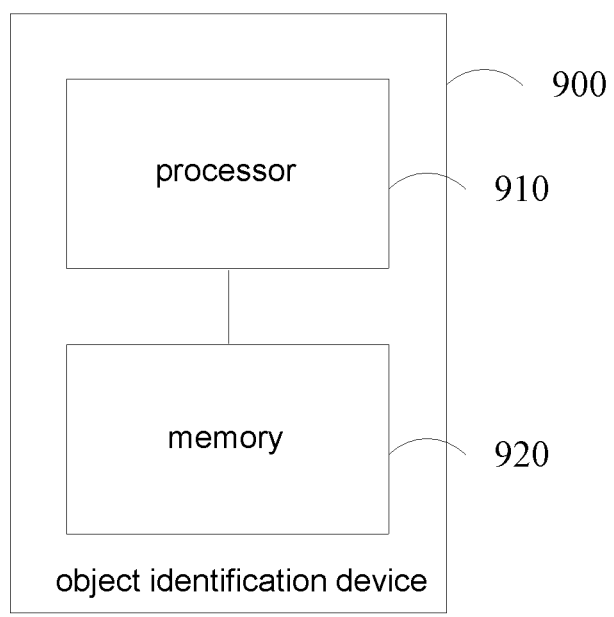
FIG. 8 shows a block diagram of an object identification device according to an exemplary embodiment of the disclosure.

As shown in FIG. 8, the disclosure also provides an object identification device 900, including a processor 910 and a memory 920. The memory 920 stores instructions. When the instructions are executed by the processor 910, the steps of the above object identification method are implemented.

Specifically, the processor 910 can perform various actions and processing according to instructions stored in the memory 920. Specifically, the processor 910 may be an integrated circuit chip with signal processing capability. The above-mentioned processor can be a general-purpose processor, a digital signal processor (DSP), a specific-purpose integrated circuit (ASIC), an off-the-shelf programmable gate array (FPGA) or other programmable logic devices, discrete gates or transistor logic devices, and discrete hardware components, which can implement or execute various methods, steps and logical block diagrams disclosed in the embodiments of the disclosure. The general-purpose processor may be a microprocessor or the processor may also be any conventional processor, etc., and may have an X86 architecture or an ARM architecture.

The memory 920 stores executable instructions, which are executed by the processor 910 to execute the above-mentioned object identification method. The memory 920 may be volatile memory or non-volatile memory, or may include volatile memory and non-volatile memory both. Non-volatile memory can be read-only memory (ROM), programmable read-only memory (PROM), erasable programmable read-only memory (EPROM), electrically erasable programmable read-only memory (EEPROM) or flash memory. The volatile memory may be random access memory (RAM), which is used as external cache memory. By way of exemplary but not restrictive description, various types of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous connection dynamic random access memory (SLDRAM), and direct memory bus random access memory (DR RAM). It should be noted that the memory in the method described herein is intended to include but not limited to these and any other suitable types of memory.

According to another aspect of the disclosure, a non-transitory computer-readable storage medium is provided. The non-transitory computer-readable storage medium stores instructions. When the instructions are executed, steps of the object identification method described above can be implemented.

Similarly, the non-transitory computer-readable storage medium in the embodiments of the disclosure may be volatile memory or non-volatile memory, or may include volatile memory and non-volatile memory both. It should be noted that the computer-readable storage medium described herein are intended to include, but are not limited to, these and any other suitable types of memory.

It should be noted that the flowcharts and block diagrams in the drawings illustrate the possible implementation architecture, functions, and operations of the system, method, and computer program product described in the various embodiments of the disclosure. In this regard, each block in the flowchart or block diagram may represent a module, program segment, or part of the code, and the module, program segment, or part of the code includes one or more executable instructions for implementing the specified logic function. It should also be noted that, in some alternative implementations, the functions marked in the block may also occur in an order different from the order marked in the drawings. For example, two blocks shown in a continuous manner may actually be executed substantially in parallel, and they can sometimes be executed in reverse order, depending on the functions involved. It should also be noted that each block in the block diagram and/or flowchart, as well as the combination of blocks in the block diagram and/or flowchart, can be implemented by using a specific and hardware-based system which is configured to execute specified functions or operations, or can be implemented by using a combination of specific hardware and computer instructions.

Generally speaking, the various exemplary embodiments of the disclosure may be implemented in hardware or specific circuits, software, firmware, logic, or any combination thereof. Some aspects of the embodiments can be implemented in hardware, while other aspects of the embodiments can be implemented in firmware or software that can be executed by a controller, microprocessor, or other computing device. When various aspects of the embodiments of the disclosure are illustrated or described as block diagrams, flowcharts, or represented in other graphics, it will be understood that the blocks, devices, systems, techniques, or methods described herein can be regarded as non-limiting examples of implementations in hardware, software, firmware, specific circuits or logic, general-purpose hardware or controllers or other computing devices, or some combination thereof.

In the specification and claims, the words "front", "rear", "top", "bottom", "above", "below", etc., if any, are used for descriptive purposes and are not necessarily used to describe the same relative position. It should be understood that the words used in this way are interchangeable under appropriate circumstances, so that the embodiments of the disclosure described herein, for example, can be operated in other orientations different from those shown or otherwise described herein.

As used herein, the word "exemplary" means "serving as an example, instance, or illustration" and not as a "model" to be copied exactly. Any implementation described in an exemplary sense herein is not necessarily interpreted as being preferred or advantageous over other implementations. Moreover, the disclosure is not limited by any theories that are expressed or implied in the technical field, background art, summary of the disclosure, or specific embodiments described above.

As used herein, the word "substantially" means to include any minor changes caused by defects of design or manufacturing, tolerances of device or component, environmental influences, and/or other factors. The word "substantially" also allows the difference between actual circumstances and perfect or ideal situation, which is caused by parasitic effect, noise, and other practical considerations that may be present in actual implementations.

In addition, the foregoing description may refer to elements or nodes or features that are "connected" or "coupled" together. As used herein, unless expressly stated otherwise, "connected" means that one element/node/feature is electrically, mechanically, logically, or otherwise directly connected to (or directly in communication with) another element/node/feature. Similarly, unless expressly stated otherwise, "coupled" means that one element/node/feature can be directly or indirectly connected to another element/node/feature mechanically, electrically, logically or in other ways to allow interaction, which is true even in the case where the two features might not be directly connected. In other words, "coupled" is intended to include direct connection and indirect connection between elements or other features, including the connection of one or more intermediate elements.

In addition, for reference purposes only, "first", "second" and similar terms may also be used herein, and thus are not intended to be limiting. For example, unless the context clearly indicates, the words "first", "second" and other such numerical words referring to structures or elements do not imply an order or a sequence.

It should also be understood that when the term "including/comprising" is used in this disclosure, it indicates the presence of the specified features, integrity, steps, operations, units and/or elements, but does not exclude the presence or addition of one or more other features, integrities, steps, operations, units and/or elements and/or combinations thereof.

In this disclosure, the term "provide" is used in a broad sense to cover all the ways to obtain an item. Therefore, "provide an item" includes but is not limited to "purchasing", "preparing/manufacturing", "arranging/assembling", and/or "ordering" objects, etc.

Although some specific embodiments of the present disclosure have been described in detail through examples, those skilled in the art should understand that the above examples are only for illustration and not for limiting the scope of the present disclosure. The various embodiments disclosed herein can be combined freely without departing from the spirit and scope of the present disclosure. Those skilled in the art should also understand that various modifications can be made to the embodiments without departing from the scope and spirit of the present disclosure. The scope of the present disclosure is defined by the appended claims.

What is claimed is:

1. An object identification method, wherein the object identification method comprises:
    acquiring a first object image, and generating a first identification result group according to the first object image, wherein the first identification result group comprises one or more first identification results arranged in order of confidence from high to low;
    acquiring a second object image, and generating a second identification result group according to the second object image, wherein the second identification result group comprises one or more second identification results arranged in order of confidence from high to low;

determining, according to the first identification result group and the second identification result group, whether the first object image and the second object image correspond to a same object to be identified;

wherein when the first object image and the second object image correspond to the same object to be identified, the second identification result group is adjusted according to the first identification result group so that the adjusted second identification result group is at least partially consistent with the first identification result group, wherein the step of determining, according to the first identification result group and the second identification result group, whether the first object image and the second object image correspond to the same object to be identified comprises:

comparing the first identification result group with the second identification result group;

wherein in a first first preset number of the first identification results in the first identification result group, when at least a second preset number of the first identification results are the same as the second preset number of the second identification results in the first first preset number of the second identification results in the second identification result group, it is determined that the first object image and the second object image correspond to the same object to be identified;

wherein the first preset number is greater than or equal to the second preset number, wherein the step of comparing the first identification result group with the second identification result group comprises:

forming the first first preset number of the first identification results in the first identification result group and the first first preset number of the second identification results in the second identification result group in a set;

determining a number of elements in the set;

comparing the number of elements with a third preset number;

wherein the third preset number is equal to twice the first preset number minus the second preset number;

when the number of elements is less than or equal to the third preset number, it is determined that, in the first first preset number of the first identification results in the first identification result group, at least a second preset number of the first identification results are the same as the second preset number of the second identification results in the first first preset number of the second identification results in the second identification result group.

2. The object identification method according to claim 1, wherein the step of generating the first identification result group according to the first object image comprises:

determining the first identification result group according to the first object image by using an object identification model which is pre-trained; and/or wherein the step of generating the second identification result group according to the second object image comprises:

determining the second identification result group according to the second object image by using the object identification model which is pre-trained.

3. The object identification method according to claim 2, wherein the object identification model determines an identification result according to at least one of a photographing location, a photographing time and a photographing environment including an object to be identified.

4. The object identification method according to claim 2, wherein the object identification model is trained based on a convolutional neural network model or a deep residual network model.

5. The object identification method according to claim 1, wherein the step of comparing the first identification result group with the second identification result group comprises:

determining photographing time intervals of the first object image and the second object image;

comparing the photographing time interval with a preset time interval;

wherein when the photographing time interval is less than or equal to the preset time interval, the first first preset number of the first identification results in the first identification result group is compared with the first first preset number of the second identification results in the second identification result group.

6. The object identification method according to claim 1, wherein the step of determining, according to the first identification result group and the second identification result group, whether the first object image and the second object image correspond to the same object to be identified comprises:

comparing the first identification result group with the second identification result group;

wherein when an identical first identification result and the second identification result do not exist in the first identification result group and the second identification result group, photographing time intervals of the first object image and the second object image are determined;

comparing the photographing time interval with a preset time interval;

wherein when the photographing time interval is less than or equal to the preset time interval, it is determined whether there is the first identification result similar to the second identification result in the first identification result group and the second identification result group;

when there is the first identification result similar to the second identification result in the first identification result group and the second identification result group, it is determined that the first object image and the second object image correspond to the same object to be identified.

7. The object identification method according to claim 6, wherein the step of determining whether there is the first identification result similar to the second identification result in the first identification result group and the second identification result group comprises:

determining whether there is the first identification result similar to the second identification result in the first identification result group and the second identification result group based on a rule database containing at least a group of similar object types.

8. The object identification method according to claim 1, wherein when the first object image and the second object image correspond to the same object to be identified, the step of adjusting the second identification result group according to the first identification result group so that the adjusted second identification result group is at least partially consistent with the first identification result group comprises:

using a first first identification result in the first identification result group as a first second identification result in the second identification result group.

9. The object identification method according to claim 8, wherein when the first object image and the second object image correspond to the same object to be identified, the step of adjusting the second identification result group according to the first identification result group so that the adjusted second identification result group is at least partially consistent with the first identification result group further comprises:
- arranging a second first identification result to a fourth preset number of the first identification results in the first identification result group, and a first fifth preset number of the second identification results in the second identification result group according to a level of confidence from high to low;
- according to the order after arrangement, the first identification results or the second identification results serve as second to subsequent second identification results in the second identification result group in sequence;
- wherein, the fourth preset number is less than or equal to a total number of the first identification results, and the fifth preset number is less than or equal to the total number of the second identification results.

10. The object identification method according to claim 9, wherein the fourth preset number is equal to the fifth preset number.

11. The object identification method according to claim 8, wherein when the first object image and the second object image correspond to the same object to be identified, the step of adjusting the second identification result group according to the first identification result group so that the adjusted second identification result group is at least partially consistent with the first identification result group further comprises:
- when an identical first identification result and the second identification result do not exist in the first identification result group and the second identification result group, it is determined whether there is the second identification result, which is similar to the first identification result in a first sixth preset number of the first identification results in the first identification result group, existing in the first sixth preset number of second identification result in the second identification result group;
- when there is the second identification result which is similar to the first identification result in the first sixth preset number of the first identification results in the first identification result group, the second identification result serves as a second second identification result in the second identification result group.

12. The object identification method according to claim 1, wherein when the first object image and the second object image correspond to the same object to be identified, the step of adjusting the second identification result group according to the first identification result group so that the adjusted second identification result group is at least partially consistent with the first identification result group comprises:
- determining whether there is the second identification result, which is the same as the first identification result in a first seventh preset number of the first identification results in the first identification result group, existing in the first seventh preset number of the second identification results in the second identification result group;
- when there is the second identification result which is the same as the first identification result in the first seventh preset number of the first identification results in the first identification result group, the second identification result serves as a first second identification result in the second identification result group.

13. The object identification method according to claim 1, wherein when the first object image and the second object image correspond to the same object to be identified, the step of adjusting the second identification result group according to the first identification result group so that the adjusted second identification result group is at least partially consistent with the first identification result group comprises:
- when an identical first identification result and the second identification result do not exist in the first identification result group and the second identification result group, it is determined whether there is the second identification result, which is similar to the first identification result in a first eighth preset number of the first identification results in the first identification result group, existing in the first eighth preset number of the second identification results in the second identification result group;
- when there is the second identification result which is similar to the first identification result in the first eighth preset number of the first identification results in the first identification result group, the second identification result serves as a first second identification result in the second identification result group.

14. The object identification method according to claim 1, wherein the object identification method further comprises:
- when the first object image and the second object image correspond to the same object to be identified, feature prompt information is output;
- wherein the feature prompt information indicates a distinguishing feature between at least one of the first identification result and/or the second identification result and an object type similar thereto.

15. The object identification method according to claim 14, wherein the feature prompt information comprises at least one of text information and picture information.

16. The object identification method according to claim 1, wherein the object identification method further comprises:
- when the first object image and the second object image correspond to the same object to be identified, photographing instruction information is output;
- wherein the photographing instruction information comprises instructions related to acquiring an image of a specific portion of the object to be identified, acquiring the image of at least the portion of the object to be identified at a different angle, or acquiring the image of at least the portion of the object to be identified at a different distance.

17. An object identification device, wherein the object identification device comprises a processor and a memory, and instructions are stored on the memory, and when the instructions are executed by the processor, steps of the object identification method described in claim 1 are implemented.

18. A non-transitory computer-readable storage medium, wherein instructions are stored on the non-transitory computer-readable storage medium, and when the instructions are executed, steps of the object identification method described in claim 1 are implemented.

* * * * *